United States Patent [19]
Guerin et al.

[11] Patent Number: 5,311,217
[45] Date of Patent: May 10, 1994

[54] VARIABLE ATTENUATOR FOR DUAL BEAMS

[75] Inventors: Jean M. Guerin, Glendale; Abd-El-Fattah A. Ibrahim, Palos Verdes Estates, both of Calif.

[73] Assignee: Xerox Corporation, Stamford, Conn.

[21] Appl. No.: 812,294

[22] Filed: Dec. 23, 1991

[51] Int. Cl.5 .............................................. H04M 1/21
[52] U.S. Cl. ..................................................... 346/108
[58] Field of Search .................. 346/1.1, 76 L, 107 R, 346/108, 160; 358/296, 300, 302

[56] References Cited

U.S. PATENT DOCUMENTS

| | | |
|---|---|---|
| 4,461,542 | 7/1984 | Gagnon ................................. 359/41 |
| 4,500,172 | 2/1985 | Gagnon et al. ...................... 359/41 |
| 4,715,684 | 12/1987 | Gagnon .............................. 359/40 |
| 5,200,843 | 4/1993 | Karasawa et al. ................... 359/40 |
| 5,216,541 | 6/1993 | Takesue et al. ..................... 359/561 |

Primary Examiner—Mark J. Reinhart
Attorney, Agent, or Firm—William Propp

[57] ABSTRACT

A variable attenuator for electronically controlling dual beam intensity comprising a laser source for emitting a light beam, a twisted nematic liquid crystal for exposure control of the light beam, a double-sided multi-layer dielectric thin film coated polarization plate for decreasing the s-component of the light beam to less than or equal to 0.0001 of the light beam emitted from the laser source, and a beam splitting crystal for separating said light beam into two beams of equal intensity.

7 Claims, 3 Drawing Sheets

VARIABLE ATTENUATOR FOR DUAL BEAMS

BACKGROUND OF THE INVENTION

This invention relates to a variable attenuator for raster output scanners, and more particularly, to a variable attenuator with a liquid crystal cell and a double-sided polarization plate for electronically controlling dual scanning beam intensity in raster output scanners.

Raster output scanners create or write images in accordance with the image content of an image signal. Typical present day raster output scanners are xerographic based and the images are written on a photoreceptor. The moving photoreceptor, having been previously charged, is exposed line by line by a high intensity beam of electromagnetic radiation, such as a laser, that has been modulated in accordance with input image signal. The modulated beam is focused by suitable optical elements to a point on the photoreceptor and scanned across the photoreceptor by a scanning element such as a rotating multi-faceted polygon. As a result, latent electrostatic images representative of the input image signal are created on the photoreceptor and thereafter developed by the application of a suitable toner thereto. The developed images are then transferred to copy sheets and fixed to provide permanent copies.

Much higher copy output speeds will be needed for future raster output scanners along with better and higher image resolutions. As an answer to this need, scanning systems employing dual scanning beams are contemplated with the intent of minimizing the rotational speed requirements imposed on the scanning element such as a polygon. This would allow the life of the scanning element shaft bearings, a critical and limiting factor to the speed at which the scanning element can safely and reliably operate, to be extended. For dual beam applications, however, a unitary or one piece modulator rather than two separate modulators is considered to be desirable. Unitary modulators consist of a single modulator crystal of suitable size having two separate sets of drive electrodes such that two separate and distinct channels are formed on the same crystal. This reduces cost and optical alignment problems since only a single modulator need be located and fixed in the optical path rather than two. The problem, however, is that for this type of modulator, two very accurately positioned and balanced intensity input beams are essential since the ability to move and adjust a separate modulator for each beam is sacrificed to obtain the advantages offered by the one piece dual modulator design.

Control over the light exposure level at the xerographic photoreceptor is required in all laser printers if acceptable prints and copies are to be produced. Indeed, imaging beam intensity is critical if the proper exposure level for the particular photoreceptor used is to be assured, and if variations in intensity across the scan line and from scan line, and in the laser output power, and in the transmittance, reflectance, and throughput efficiency of the various optical components are to be compensated for. Exposure control takes on added importance and criticality with increased print resolution, half-toning, single-pass highlight color, and other developments where an intensity variation of no more than +/−1 percent is desired.

Where gas lasers are used as the scanning beam source, light intensity is not directly variable at the source. In the past, if intensity control were to be provided, the drive power to the acousto-optic modulator was typically controlled. This allowed the diffraction efficiency of the modulator to be adjusted which in turn controlled the intensity of the scanning beam and provided the exposure levels desired. Uniform exposure across the photoreceptor together with other performance factors requires that the modulator be operated at saturating drive power levels, precluding control over beam intensity by controlling modulator drive power.

Since exposure control through adjustment of the modulator drive power is no longer an available option, other control techniques have been considered and tried but without success. These control techniques include the addition of neutral density filters to the scanner optical system or supporting the entire laser tube assembly for rotation, so as to permit the laser to be turned for optimum polarization with respect to the modulator. Unfortunately, the use of neutral density filters and adjustment of the laser tube assembly can only be implemented manually, greatly limiting their desirability. Furthermore, the use of neutral density filters can induce flare light and cause beam aberrations, while permitting adjustment of the laser tube assembly can result in pointing errors in the laser beam and require subsequent realignment of the optical components following each adjustment.

A twisted nematic liquid crystal can provide controlled rotation of the plane of polarization of the laser beam, such control being in response to beam intensity monitored at the photoreceptor. A liquid crystal twist cell can be disposed between a linear polarizer and a guest/host-type liquid crystal cell.

U.S. Pat. No. 4,920,364 to Andrews et al., assigned to the same assignee as the present application and incorporated herewithin by reference, discloses a variable attenuator for controlling scanning beam intensity having a twisted nematic liquid crystal for rotating the beam polarization and a polarization analyzer to block out the polarization component normal to the analyzer polarization axis, thereby resulting in beam intensity attenuation.

If a liquid crystal cell is used in the variable attenuator, the liquid crystal rotates the polarization of the light transmitted through the crystal. As the voltage applied to the liquid crystal varies, the amount of polarization rotation of the light transmitted through the crystal also varies.

Sheet polarizers have been suggested to remove the varying polarization of the light caused by the liquid crystal. Sheet polarizers transmit the optical polarization component (P-component) which lies along the polarization axis of the material and absorb the optical polarization component (S-component) normal to the polarization axis of the material. However, this absorption of the S-component is not infinite and a portion of the S-component is transmitted with the P-component. Additionally, the absorption of optical energy results in a local temperature increase of the sheet polarizer which then leads to beam shape distortion.

Polarizers can be optical plates coated on a single side with a multi-layer dielectric thin film coating designed such that when tilted close to the Brewster angle, the polarizer plate will transmit over 95 percent of the P-component and reflect over 99 percent of the S-component. Again however, a portion of the S-component of less than 1 percent will be transmitted through the polarizer plate.

Because of this seemingly negligible transmittance of the S-component, if the polarization of the input beam to the polarizer is rotated, the polarization of the output beam from the polarizer will also rotate away from the polarizer axis instead of being exactly along the polarizer axis, which is a main function of a polarizer in the first place, namely output polarization exactly aligned with the polarizer axis. A polarizer is often used to obtain a highly linear polarization in a controlled direction indicated by the polarizer axis.

If the input beam is to be used to create a dual beam by using polarization sensitive optics, still further problems arise. When the output polarization rotates by just a few degrees, large intensity variations are created between two beams generated, for example, in a beam splitting crystal.

However, the physical quantities of the optical beam most effected in the beam splitting crystal by the S-component transmittance are the amplitude of the optical field, i.e. the electric field magnitude and direction of the optical field. Optical intensity is proportional to the square of the electric field amplitude. Therefore, even though a less than one percent (0.01) intensity transmittance of the S-component seems negligible, its amplitude is a significant 0.1.

Thus, as shown in FIG. 1, an incident beam would have an input polarization, $E_{in}$, at an angle $\theta$ with respect to the polarization plate P-component axis. Decomposing along the S and P directions, the beam would have $$S\text{-comp} = E_{in} \sin \theta \quad \text{[Equation 1]}$$

and $$P\text{-comp} = E_{in} \cos \theta \quad \text{[Equation 2]}$$

If the S-component intensity transmission, $T_s$, is very small and the P-component intensity transmission, $T_p$, is large ($\geq 95\%$). The emerging E fields amplitudes ($S\text{-comp}_{out}$ and $P\text{-comp}_{out}$), since the amplitude is proportional to the square root of the intensity, will be $$S\text{-comp}_{out} = \sqrt{T_s} E_{in} \sin \theta \quad \text{[Equation 3]}$$

and $$P\text{-comp}_{out} = \sqrt{T_p} E_{in} \cos \theta \quad \text{[Equation 4]}$$

This square root effect also affects the polarization angle out of the polarizer. Instead of having the output polarization almost entirely in the P direction, it is at an angle $\epsilon$, where $$\text{Tan } \epsilon = (S\text{-comp}_{out}/P\text{-comp}_{out}) = \sqrt{(T_s/T_p)} \tan \theta \quad \text{[Equation 5]}$$

If the polarization plate has an S rejection ratio of 100:1 for the S-comp, then $T_s = 0.01$, and $\sqrt{T_s} = 0.1$.

The light incident to a beam splitting crystal is normally at an input angle, $\theta$ of 45°, to produce dual beams of equal intensity. The incident beam from the polarizer with a $T_p$ of 0.95 and $T_s$ of 0.01, the angle $\epsilon$ off of the polarizer axis is found to be 5.85°. An angle $\epsilon$ of 5.85° will cause the two beams produced by the beam splitter to differ in intensity by 44 percent, which is outside the parameters of producing dual beams of equal intensity for a raster output scanner.

Polarization plates are also difficult to manufacture. The angle of incidence has been found to be unpredictable. To obviate this, the polarization plate may be supported in an adjustable cylindrical housing or barrel in order to permit fine adjustment in the orientation of plate to be made.

An expensive solution would be to add a liquid crystal cell to compensate the polarization rotation back. It would basically be an electronic substitute to the barrel rotation. However, it would involve a feedback mechanism similar to the one in U.S. Pat. No. 4,920,364.

It is an object of this invention to provide a variable attenuator for electronically controlling dual scanning beam intensity.

It is another object of this invention to provide a variable attenuator with a single liquid crystal and a double-sided polarization plate for producing dual beams of equal intensity from a beam splitter.

SUMMARY OF THE INVENTION

In accordance with the present invention, a variable attenuator for electronically controlling dual beam intensity comprising a laser source for emitting a light beam, a twisted nematic liquid crystal for exposure control of the light beam, a double-sided multi-layer dielectric thin film coated polarization plate for decreasing the s-component of the light beam to less than or equal to 0.0001 of the light beam emitted from the laser source, and a beam splitting crystal for separating said light beam into two beams of equal intensity.

The variable attenuator can have a Brewster plate between the polarization plate and the beam splitting crystal to separate a portion of the beam for a polarization analyzer to control the voltage applied to the liquid crystal to vary the degree of rotation of the beam from the liquid crystal.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
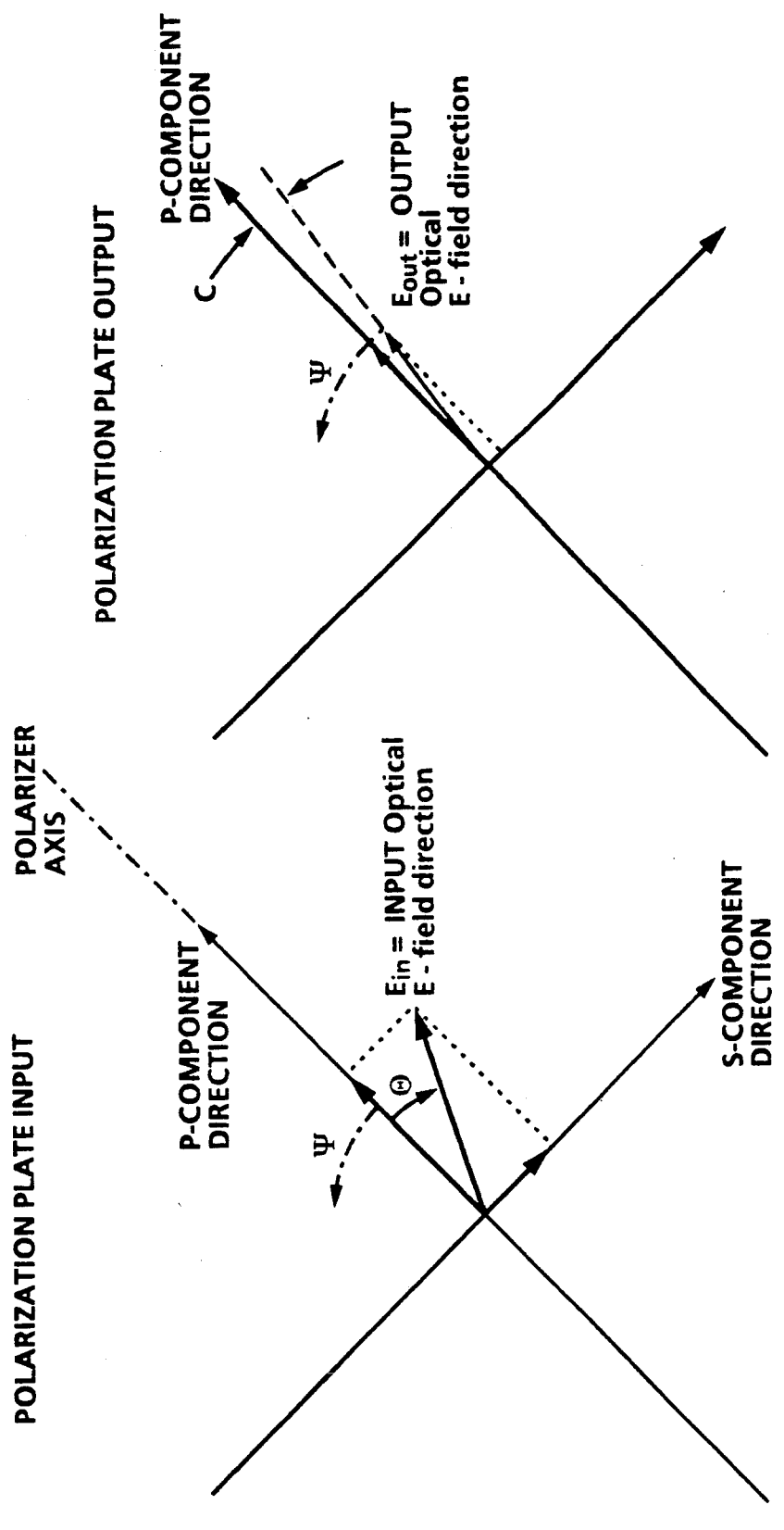
FIG. 1 is a schematic illustration of polarization plate input and output beams along the polarizer axis.
Figure 2:
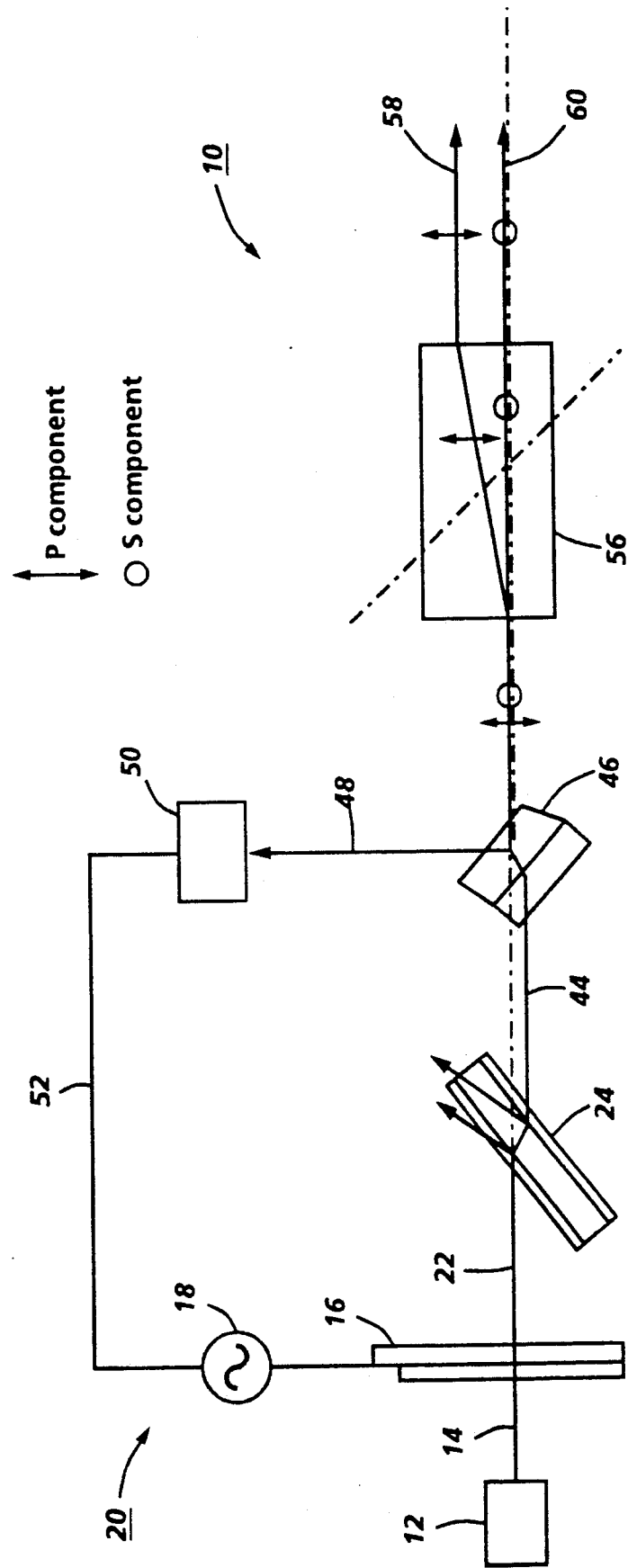
FIG. 2 is a schematic illustration of the side view of the variable attenuator for electronically controlling dual scanning beam intensity formed according to the present invention.
Figure 3:
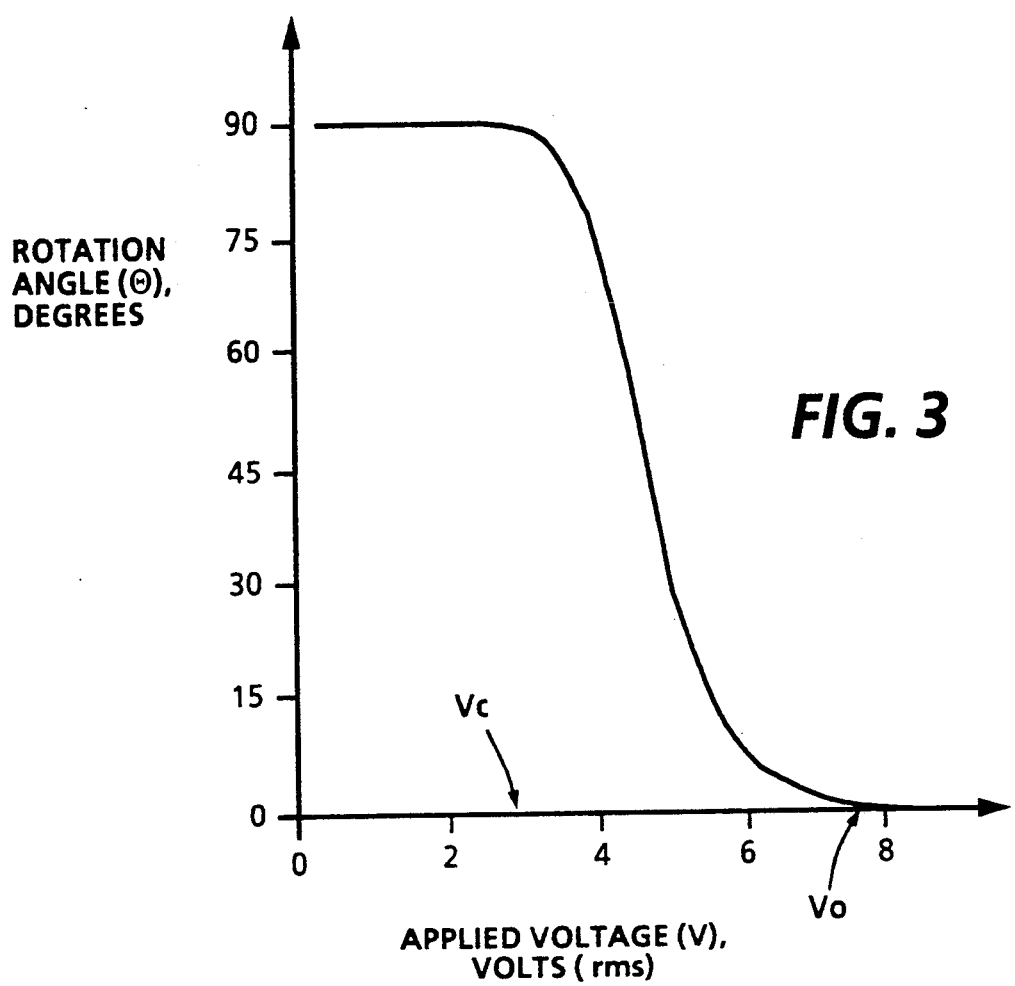
FIG. 3 is a graph plotting the degree of rotation imposed by a twisted nematic liquid crystal on the plane of polarization of an incident beam versus applied voltage.

Reference is now made to FIG. 2, wherein there is illustrated a variable attenuator 10 of the present invention.

The variable attenuator 10 includes a laser source 12 which emits a high intensity radiation light beam 14. The linearly polarized light beam 14 passes though a twisted nematic liquid crystal cell 16 which acts as a polarization rotator to control the amount of beam exposure for the variable attenuator 10.

The liquid crystal 16 rotates the polarization of the light beam 14 which is transmitted through the crystal by the voltage applied through the liquid crystal. A source of variable electrical potential, i.e., an a.c. voltage source 18 provides a voltage $V_0$ for controlling the twist angle of the liquid crystal 16, the voltage source 18 being controlled through a feed back loop 20 in response to the intensity of the beam.

The liquid crystal 16 has a relatively thin nematic liquid crystal layer sandwiched between the alignment layers. The dielectric barrier layers are disposed between the alignment layers and transparent electrode layers with outer glass substrates covering the electrode layers.

In the absence of an external electric field (V=0), a nematic liquid crystal rotates the plane of polarization of a linearly-polarized beam of light incident thereon through the twist angle of the liquid crystal cell. Thus, a 90 degree twist will lead to a 90 degree rotation.

If an alternating voltage $V_0$, which is higher than the crystal threshold value ($V_c$) by a few volts, is applied to the cell, the direction of the molecular orientation pattern of the crystal will be realigned and become somewhat parallel to the applied field, that is, normal to the cell walls. This degrades the rotatory power of the cell and accordingly, there will be less rotation of the plane of polarization of the incident light and hence less alteration or change in the polarization of the beam.

Figure 4:
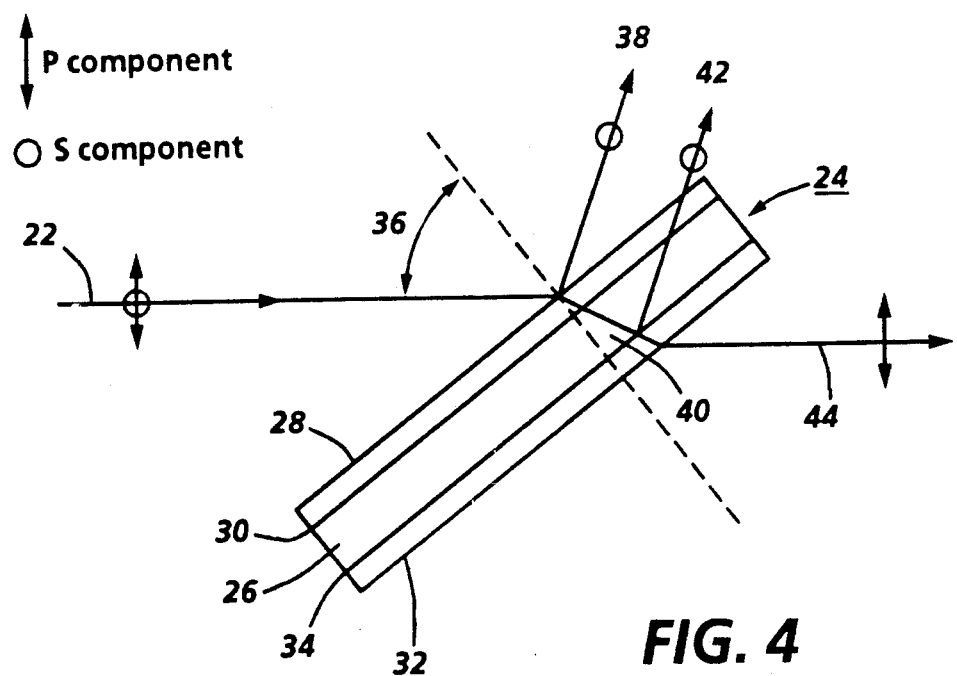
FIG. 4 is a schematic illustration of the side view of the double-sided multi-layer dielectric thin film coated polarization plate of FIG. 1 formed according to the present invention.

FIG. 4 shows the dependence of the rotation angle $\theta$ of an incident linearly polarized light on the applied voltage for a typical twisted nematic liquid crystal. It can be seen that by applying an intermediate voltage V ($V_c \leq V \leq V_0$) to the crystal, the polarization of the light can be rotated continuously from 0 to 90 degrees.

The randomly polarized light beam 22 from the liquid crystal 16 passes through a polarization plate 24. As best seen in FIG. 4, polarization plate 24 has a substrate 26 with a multi-layer dielectric thin film coating 28 on the incident surface 30 and a multi-layer dielectric thin film coating 32 on the exit surface 34.

The randomly polarized light beam 22 has both a p-component and a S-component from the liquid crystal 16. As the light beam is incident on the polarization plate 24 at the Brewster angle 36, the first dielectric stack coating 28 will reflect the S-component 38 of the beam and transmit the P-component 40 of the beam.

Typically, for a given optical wavelength, the dielectric stack coating can be designed such that the intensity transmission of the P-component is greater than 95 percent, and that the intensity transmission of the S component is less than 1 percent.

The beam then passes through the substrate 26 and the second dielectric stack coating 32 will reflect the remaining S-component 42 of the beam and transmit the P-component 44. The dielectric stack coating will transmit over 95 percent (0.95) of the P-component and reflect over 99 percent of the S-component.

The double coating of the polarization plate squares the transmission percentage of the polarization components of the incident light beam.

Thus, the P-polarized beam 44 from the polarization plate 24 will have a P-transmission, $T_p$, of $(0.95)^2$ or 0.9025. However, the S-transmission, $T_s$, changes from 0.01 of the single coating to the double coating of $(0.01)^2$ or $10^{-4}$ or (0.0001). This S-transmission squared reduction due to the double-sided multi-layer dielectric thin film coated polarization plate 20 almost totally eliminates the output polarization rotation. Returning to Equation 5, for $T_s$ of 0.9025 and $T_p$ of 0.0001, the angle $\epsilon$ is now only 0.6°.

Returning to FIG. 2, the P-polarized beam 44 from the polarization plate 24 then passes through a Brewster plate 46.

A source of variable electrical potential, i.e., an a.c. voltage source 18 provides a voltage $V_0$ for controlling the twist angle of the liquid crystal 16, the voltage source 18 being controlled through a feed back loop 20 in response to the intensity of the beam. Feedback loop 20 has a polarization analyzer in the form of Brewster plate 46 which separates a portion 48 of the P-polarized beam 44 for use in analyzing the intensity of the beam output by liquid crystal 16. To measure beam intensity, the portion 48 of the P-polarized beam 44 is impinged on a suitable detector, such as photocell 50. The signal output of photocell 50 is fed via line 52 to the controller for voltage source 18 to control the voltage $V_0$ applied to the liquid crystal 16 and accordingly the degree of alteration of the plane of polarization of primary beam 14 by the liquid crystal 16.

The liquid crystal 16 and the polarization plate 24 act as shutter to control the amount of light for the variable attenuator by the liquid crystal rotating the polarization among the p-component and s-component and the polarization plate only transmitting the p-polarization component.

The P-polarized beam 44 after passing through the Brewster plate 42 is incident upon a beam splitting crystal 56 at an incident angle, $\theta$, of 45°. The beam splitting crystal 56 consists of a single piece of birefrigent material such as calcite.

The beam splitter 56 splits the P-polarized beam 44 into an ordinary beam 58 and an extraordinary beam 60 which emerge parallel from the beam splitter 56. The polarizations of the ordinary beam 58 and the extraordinary beam 60 are orthogonal to each other with equal intensity. The beam 58 to beam 60 intensity variation from the beam splitting crystal with the double-sided multi-layer dielectric thin film coated polarization plate 20 is reduced by ten times from approximately 44% to 4.2%.

For the beam splitting crystal 56, the P-polarized beam 44 with an input polarization of E will enter the crystal at an incident angle $\theta$. The intensity of the extraordinary beam 60 will be, within a constant, $E^2\cos^2\theta$ and the intensity of the ordinary beam 58 will be, within the same constant, $E^2\sin^2\theta$. The ratio of the extraordinary beam to the ordinary beam is $\cos^2\theta/\sin^2\theta$. With an angle of 45 degrees, that ratio is 1. With an angle of 45 degrees plus 5.85 degrees, that ratio is 1.5 while with an angle of 45 degrees plus 0.6 degrees, that ratio is 1.042.

While a twisted nematic liquid crystal is shown and described, other suitable liquid crystal types such as cholesteric liquid crystals, electrically controlled birefringence of parallel aligned liquid crystals, 'supertwist' liquid crystals, etc., may be used instead.

Many low cost lasers are not randomly polarized but are instead elliptically polarized. To accomodate this, a quarter wave plate (not shown) can be provided in the optical path between the laser source 12 and the liquid crystal cell 16 to convert any polarization of the laser beam 14 into circular polarization for input to the liquid crystal.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A variable attenuator for electronically controlling dual beam intensity comprising
   a laser source for emitting a light beam,
   a liquid crystal for exposure control of said light beam from said laser source,
   polarization means for decreasing the s-polarization component of said light beam from said liquid crystal, and
   beam splitting means for separating said light beam from said polarization means into two beams of equal intensity.

2. The variable attenuator for electronically controlling dual beam intensity of claim 1 further comprising a Brewster plate and feedback and analyzing means between said polarization means and said beam splitting means, said Brewster plate for separating a portion of said light beam from said polarization means to said feedback and analyzing means to control the voltage applied to said liquid crystal.

3. The variable attenuator for electronically controlling dual beam intensity of claim 1 wherein the intensity of said s-polarization component is decreased to less than or equal to 0.0001 of said light beam emitted from said laser source.

4. The variable attenuator for electronically controlling dual beam intensity of claim 1 wherein said liquid crystal comprises a twisted nematic liquid crystal.

5. The variable attenuator for electronically controlling dual beam intensity of claim 1 wherein said polarization means comprises a double-sided multi-layer dielectric thin film coated polarization plate.

6. The variable attenuator for electronically controlling dual beam intensity of claim 1 wherein said beam splitting means comprises a beam splitting crystal.

7. A variable attenuator for electronically controlling dual beam intensity comprising
   a laser source for emitting a light beam,
   a twisted nematic liquid crystal for exposure control of said light beam from said laser source,
   a double-sided multi-layer dielectric thin film coated polarization plate for decreasing the s-polarization component of said light beam from said twisted nematic liquid crystal, to less than or equal to 0.0001 of said light beam emitted from said laser source,
   a Brewster plate and feedback and analyzing means for separating a portion of said light beam from said polarization means to said feedback and analyzing means to control the voltage applied to said twisted nematic liquid crystal, and
   a beam splitting crystal for separating said light beam from said polarization plate into two beams of equal intensity.

* * * * *